Patented Apr. 25, 1944

2,347,461

UNITED STATES PATENT OFFICE 2,347,461

TREATMENT OF FAT-SOLUBLE VITAMIN MATERIALS

Loran O. Buxton, Belleville, N. J., assignor to National Oil Products Company, Harrison, N. J., a corporation of New Jersey No Drawing. Application May 11, 1940, Serial No. 334,577

8 Claims. (Cl. 167—81)

The invention relates in general to the concentration of fat-soluble vitamins and more particularly to a process of increasing the potency of natural and synthetic fat-soluble vitamin compositions.

Many processes have been developed in the past for recovery of vitamins A and D from natural sources and for the preparation of vitamin D by synthetic means. Much work has been expended in an attempt to improve these processes, whereby the potency and purity of the ultimate products could be increased. While certain of these processes have been used commercially with more or less success, the ever present problem of increasing the purity and potency of vitamin A and/or D compositions and concentrates still remains.

The general object of the invention is to provide an improved process for increasing the potency and purity of fat-soluble vitamin-containing concentrates.

A specific object of the invention is to provide an improved process of stepping up the potency of vitamin A and/or D concentrates of either natural or synthetic origin.

Other objects of the invention will in part be obvious and will in part appear hereinafter.

According to the process of the invention, fat-soluble vitamin-containing concentrates are contacted with a polyvalent metal phosphate adsorbent, wherein the metal is one selected from the group consisting of calcium, barium, magnesium, aluminum and strontium. The aforementioned phosphates are used in their so-called activated form and preferably along with an organic solvent for the vitamin-bearing material. In those cases where the vitamin-bearing material to be treated contains vitamin A or provitamin A, precaution should be taken to exclude air and other oxidizing influences which serve to destroy this vitamin. Any suitable procedure may be followed in contacting the activated phosphate adsorbent with the vitamin-bearing material, it being preferred, however, to admix the activated phosphate with sufficient solvent to at least wet and deaerate the same and admixting the vitamin-bearing material or a solvent solution thereof with the activated phosphate and agitating the mass to permit the latter to adsorb the fat-soluble vitamins present therein. On completion of the adsorption step, the adsorbed vitamin is elutriated by means of a suitable solvent or combination of solvents.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, any suitable polyvalent metal phosphate which will not destroy the vitamin A and/or D in the material to be treated may be used. Among the phosphate adsorbents of the aforementioned type which may be used are trimagnesium phosphate, tristrontium phosphate, tribarium phosphate, tricalcium phosphate, dicalcium phosphate, monocalcium phosphate, aluminum phosphate or any phosphate composed of the combination of the foregoing metals with one another or with hydrogen. In selecting the absorbent, care should be taken to avoid obtaining one or a combination of phosphates which will be too highly acidic, which will, in turn, destroy the vitamin A or D content of the material to be treated. In certain cases where it is desirable to use a phosphate or a combination of phosphates of the aforementioned type which are slightly acidic, the hydroxide or oxide of calcium, magnesium, strontium, barium or aluminum may be used in combination therewith to offset the acidity. For example if monocalcium phosphate is used, calcium oxide or calcium hydroxide may be added thereto, thereby reducing the acidity of phosphate adsorbent as a whole. Of course in using the phosphate adsorbents, it is necessary that they be used in their activated form and preferably in a powdered form on the order of about 200 mesh. It is obvious, of course, that large lumps of a highly porous form of the phosphate adsorbent may also be used. The foregoing salts may very readily be activated by heating the same above 100° C. to drive off any adsorbed air or combined or uncombined water therein. During the process the system is preferably kept substantially anhydrous so that even though the phosphate adsorbent is slightly acid, no destruction of the vitamin A and/or D will take place. While any suitable polyvalent metal phosphate of the aforementioned type may be used alone or in combination with any of the oxides or hydroxides of said polyvalent metals in the process of the invention, it is highly preferred to use either tricalcium phosphate or tribarium phosphate, either alone or in combination with one another, or in combination with the oxides or hydroxides of barium and calcium. Moreover, any of the aforesaid oxides or hydroxides, such, for example, as calcium oxide or hydroxide may be combined with any of the above-named polyvalent metal phosphates and used as the adsorbent in carrying out the process of the invention.

In the step of contacting the fat-soluble vitamin-concentrate with the adsorbent, various means may be employed; for example the adsorbent may be disposed in a column and the vitamin-concentrate preferably dissolved in a non-polar organic solvent passed through the column, whereby the phosphate adsorbs the fat-soluble vitamins during their passage through the column. Before the vitamin-concentrate is passed through the column, the activated adsorbent should be deaerated, especially when vitamin A is present. Deaeration of the column and adsorbent therein may be accomplished by passing solvent and/or an inert gas therethrough. It has been found, however, that highly superior results are obtained if a deaerated solvent-adsorbent mixture is first prepared in an open vessel and the vitamin-concentrate admixed therewith with constant stirring. In preparing a deaerated mixture, the selected adsorbent or combination of adsorbents is added to a portion of solvent with stirring. This mixture may be heated or not during the stirring operation to drive out any air in the solvent or adsorbent. Due to the volatile nature of the solvent, a layer of solvent vapor is maintained immediately above the surface of the liquid, thereby preventing any air from reaching the vitamin material being processed. This feature guards against the destruction of vitamin A by oxidation.

After this mixture has been deaerated, the vitamin-concentrate dissolved in a solvent or not is then added to and stirred with the deaerated mixture for a length of time sufficient to adsorb a major portion of the vitamin content of the original material. It has been found that an equilibrium is finally reached wherein the adsorbent material reaches its capacity of adsorption, whereby no further vitamin A or D is adsorbed. Such an equilibrium condition is usually reached after about 30 minutes of contact with the adsorbent. When this equilibrium condition has been reached, the fluid is removed from the adsorbent as by filtration or any other suitable means. The resulting filtrate is then subjected to a second deaerated solvent-adsorbent mixture of the aforementioned type, whereby a major portion of the vitamins not adsorbed in the first step is adsorbed. A filtrate produced in the separation of the adsorbent in the second step may be treated again and again until all the vitamins have been removed from the original material. It has been found through experience that about three such adsorption steps is sufficient to recover substantially all the vitamins in the original material. The unadsorbed vitamins remaining in the original solvent solution may be recovered in any suitable known manner.

In carrying out the process of the invention, any suitable solvent may be used in the preparation of the vitamin-containing solution and/or in the preparation of deaerated adsorbent mixture. It is preferred to use a non-polar solvent in this phase of the process, which may include, inter alia, petroleum ether, ethyl ether, methyl ethyl ether, heptane, hexane, octane, cyclohexane, methyl cyclohexane, benzene and the like. The solvent must be characterized by being a solvent for vitamin-containing concentrates or any other form of concentrated natural or synthetic vitamins A and/or D. It is also preferred in commercial practice to use solvents which are relatively volatile so that they may be readily distilled off from the concentrates. After a given fat-soluble vitamin-concentrate has been subjected to the required number of adsorption steps, the adsorbent material resulting from each step is combined and elutriated by means of any suitable non-polar solvent of the aforementioned or other type to recover the vitamins A and/or D from the phosphate adsorbent. In this elutriating step a small percentage of a polar solvent is preferably admixed with the non-polar solvent before treatment of the adsorbent to remove the vitamins. It has been found, for example, that by including in the eluting solvent about 2% to 10% of a polar solvent, the amount of washing to remove the vitamins from the adsorbent is materially decreased, less solvent may be used and a saving in time is effected. Such polar solvents would include alcohols, ketones or other oxygen-containing organic solvents; suitable polar solvents include, among others, methanol, ethanol, propanol, isopropanol, acetone, methyl ethyl ketone, etc.

In order to guard against the oxidation of vitamin A during the process, it is quite important to maintain the adsorbent solvent in a wetted condition between the adsorbing and elutriating steps as by so doing the oxygen in the ambient atmosphere will not penetrate the solvent vapor layer formed around the adsorbed mass. In removing the adsorbed vitamins when the column process is used, it is preferred to use a solvent combination of the aforementioned type, wherein the non-polar solvent contains a relatively small proportion of polar solvent.

After the fat-soluble vitamins have been removed from the phosphate adsorbent, the solution resulting therefrom is subjected to distillation. This distillation is preferably carried out under reduced pressure, and if vitamin A is present, under an inert atmosphere such as nitrogen.

The process of the invention is applicable for the extraction or concentration of vitamins A and D from any suitable concentric containing the same. Such concentrates include, among others, the unsaponifiable fraction or concentrates of fish liver oils such as obtained from cod, tuna, sword fish, shark, sardine, ling cod, halibut, sole, mackeral or like fish; vegetable oils containing carotene such as palm oil, carrot oil or the like. Carotene, of course, is a pro-vitamin A, and for the purposes of this application is considered synonomous with vitamin A. The process of the invention is also adapted for the treatment of synthetic vitamin D products such as irradiated ergosterol, cholesterol, 7-dehydrocholesterol and other sterols, as well as other forms of electro-chemically, chemically or photochemically activated sterols. In concentrating synthetic vitamin D products of the aforementioned type, any of the aforementioned polyvalent metal phosphate adsorbents may be employed alone or in combination with any oxide or hydroxide of calcium, barium, aluminum, strontium or magnesium.

For a fuller understanding of the nature and objects of the invention, reference should be had to the following examples which are given merely to further illustrate the invention and are not to be construed in a limiting sense, all parts given being by weight.

*Example I*

In an open vessel 50 parts of activated tricalcium phosphate of 200 mesh were admixed with 400 parts of cyclohexane and the mixture stirred for about 5 to 10 minutes to completely deaerate the same. 100 parts of a tuna liver oil concentrate containing 2,000,000 U. S. P. units of vitamin D per gram and 1,000,000 U. S. P. units of vitamin A per gram were added to the deaerated mixture and stirred for about 30 to 60 minutes. The phosphate adsorbent bearing the adsorbed vitamins A and D was removed by filtration and the solvent wetted residue elutriated with a mixture of 95 parts of cyclohexane and 5 parts of ethanol. The filtrate from the first adsorption step was again treated twice more in the foregoing manner with activated tricalcium phosphate and the elutriated portions combined. The solvent was removed from the combined elutriated vitamin portions by vacuum distillation in the presence of nitrogen gas. The resulting concentrate was found to contain 4,500,000 units of vitamin D per gram and 1,970,000 units of vitamin A per gram. The taste, odor and color of the resulting high potency concentrate were greatly improved over that of the starting material.

Example II

Three one-part portions of activated $Ba_3(PO_4)_2$ (200 mesh) were admixed with three three-part portions of heptane solvent respectively, after which each mixture was deaerated by stirring. Two parts of a tuna liver oil concentrate containing 2,000,000 units of vitamin D per gram and 1,000,000 units of vitamin A per gram were stirred for 30 to 60 minutes with the first portion of the aforementioned deaerated mixture, after which the mass was filtered in an inert atmosphere. The filtrate was then similarly treated with the second deaerated mixture and the filtrate thereof treated with the third deaerated mixture. The three solvent wetted $Ba_3(PO_4)_2$ portions bearing the adsorbed vitamins were then combined and the vitamins elutriated by washing with heptane solvent containing 5% methanol. The solvent was then removed by vacuum distillation conducted in the presence of nitrogen. The resulting concentrate was found to have a potency of 4,000,000 units of vitamin D per gram and 1,800,000 units of vitamin A per gram.

Example III

By subjecting irradiated ergosterol (Winthrop) to the process of Example I using petroleum ether in lieu of cyclohexane the potency in vitamin D units was doubled.

Example IV

By following the process of Example II using a 50–50 mixture of $Ca_3(PO_4)_2$ and $Ca(OH)_2$ in lieu of $Ba_3(PO_4)_2$ and using octane ("Skelly Solve E") in lieu of heptane, the potency of a palm oil concentrate was increased from 2200 gammas per gram to 40,000 gammas per gram.

Example V

By following the process of Example I substituting trialuminum phosphate for tricalcium phosphate, the potency of a pollack liver oil concentrate containing 1,000,000 units of vitamin A per gram was increased to 2,100,000 units of vitamin A per gram.

For the sake of brevity the expression "units" of vitamin A and/or D has been resorted to; this expression is to be interpreted as U. S. P. units or International Rat Units (I. R. U.) which are equivalents.

Since certain changes may be made in carrying out the above process without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent is:

1. A process of increasing the potency of a fat-soluble vitamin concentrate selected from the group consisting of vitamin A, vitamin D and vitamin A and D concentrates which comprises contacting the concentrate with an activated phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

2. A process of increasing the potency of a fish liver oil concentrate which comprises contacting the concentrate with an activated phosphate of a polyvalene metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

3. A process of increasing the vitamin D potency of an activated sterol which comprises contacting the activated sterol with an activated phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

4. A process of increasing the potency of a vitamin A and D concentrate which comprises contacting the concentrate with an activated phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

5. A process of increasing the vitamin D potency of a synthetic vitamin D composition which comprises contacting the synthetic vitamin D composition with an activated phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

6. A process of increasing the potency of a fat-soluble vitamin concentrate selected from the group consisting of vitamin A, vitamin D and vitamin A and D concentrates which comprises contacting the concentrate with an activated mixture of calcium oxide and a phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

7. A process of increasing the potency of a fish liver oil concentrate which comprises contacting the concentrate with an activated mixture of calcium oxide and a phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

8. A process of increasing the vitamin D potency of an activated sterol which comprises contacting the activated sterol with an activated mixture of calcium oxide and a phosphate of a polyvalent metal selected from the class consisting of calcium, barium, aluminum, magnesium and strontium, in the presence of a non-polar solvent, separating the phosphate bearing the vitamin adsorbed thereon and eluting the adsorbed vitamin from the phosphate adsorbent by means of a non-polar solvent containing a minor portion of a polar solvent.

LORAN O. BUXTON.